United States Patent [19]

von Tiesenhausen

[11] 4,381,583

[45] May 3, 1983

[54] BEAM CONNECTOR APPARATUS AND ASSEMBLY

[75] Inventor: Georg F. von Tiesenhausen, Huntsville, Ala.

[73] Assignee: The United States of America as represented by the Administrator of the National Aeronautics and Space Administration, Washington, D.C.

[21] Appl. No.: 195,226

[22] Filed: Oct. 8, 1980

[51] Int. Cl.³ .............................................. A44B 21/00
[52] U.S. Cl. ...................................... 24/214; 244/159
[58] Field of Search ........... 24/208 R, 213 R, 213 CS, 24/214, 230 AP, 255 R, 255 BS, 257; 244/159; 403/405; 52/750

[56] References Cited

U.S. PATENT DOCUMENTS 1,807,293  5/1931  Keller .............................. 24/230 AP
2,464,543  3/1949  Modrey ................................. 24/208
4,186,465  2/1980  Manning ..................... 24/230 AP X

FOREIGN PATENT DOCUMENTS 996643 12/1951 France ................................... 24/213

Primary Examiner—Robert P. Swiatek
Attorney, Agent, or Firm—L. D. Wofford, Jr.; J. R. Manning; J. H. Beumer

[57] ABSTRACT

Connector apparatus and assembly is disclosed for connecting beams and the like structural members which is particularly advantageous for connecting two members together when moved laterally into place since the connector apparatus requires no relative longitudinal movement between the ends of the beams or members being connected to make a connection joint. The connector apparatus includes a receptacle member A and a connector housing B carried by opposed ends of the structural member being connected wherein a spring-loaded connector member C is carried by the connector housing B which may be released for extension and engagement into the receptacle member A.

15 Claims, 6 Drawing Figures

BEAM CONNECTOR APPARATUS AND ASSEMBLY

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates to connector apparatus and assembly for connecting the ends of beams and the like structural components. The invention is particularly advantageous in connecting structured beams together in space as part of large space platform assemblies for supporting later space missions. The connector apparatus may also be utilized to connect parts and equipment to existing structures.

Heretofore, conventional connector methods have been utilized in the assembly of structures in space such as the use of nuts and bolts and flanges However, these connections require significant manual work to engage and disengage.

Other prior devices have used pyrotechniques to form connection between the ends of beams and like structural members. However, these techniques require the use of explosive charges sensitive to RF environments which can be quite strong during orbital platform assembly operations rendering these techniques undesirable. Furthermore, such a connection is permanent and cannot be separated without destruction of the connection joint and do not provide for automatic alignment of the members.

Accordingly, an important object of the present invention is to provide apparatus for connecting structural members such as utilized in the construction of large assemblies orbiting in space which requires little or no manual labor and may be easily automated.

Another important object of the present invention is to provide apparatus for connecting opposing ends of structural beams which provides reliability in alignment and positive connection.

Yet another important object of the present invention is to provide simple yet reliable apparatus for connecting opposing ends of structural beams and the like which affords quick connection and disconnection with no extra tools.

Yet another important object of the present invention is to provide apparatus for connecting free ends of structural beams and the like, particularly in space, which can accommodate compression, tension, and torque loads.

Yet another important object of the present invention is to provide apparatus for connecting free ends of structural beams and the like when moved laterally into place wherein the connector apparatus requires no relative longitudinal movement between the ends of the beams or members being connected to make a connection joint.

SUMMARY OF THE INVENTION

It has been found that apparatus for connecting free ends of structural members such as beams can be had by providing a receptacle member carried by one free end and a housing member carried by the other free end by which a spring-loaded connector member is slidably carried wherein the connector member includes prongs for engaging window openings in the receptacle. A guide plate guides a laterally moved beam into an axial, aligned position so that the connector member may be released for extension and engagement with the receptacle.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
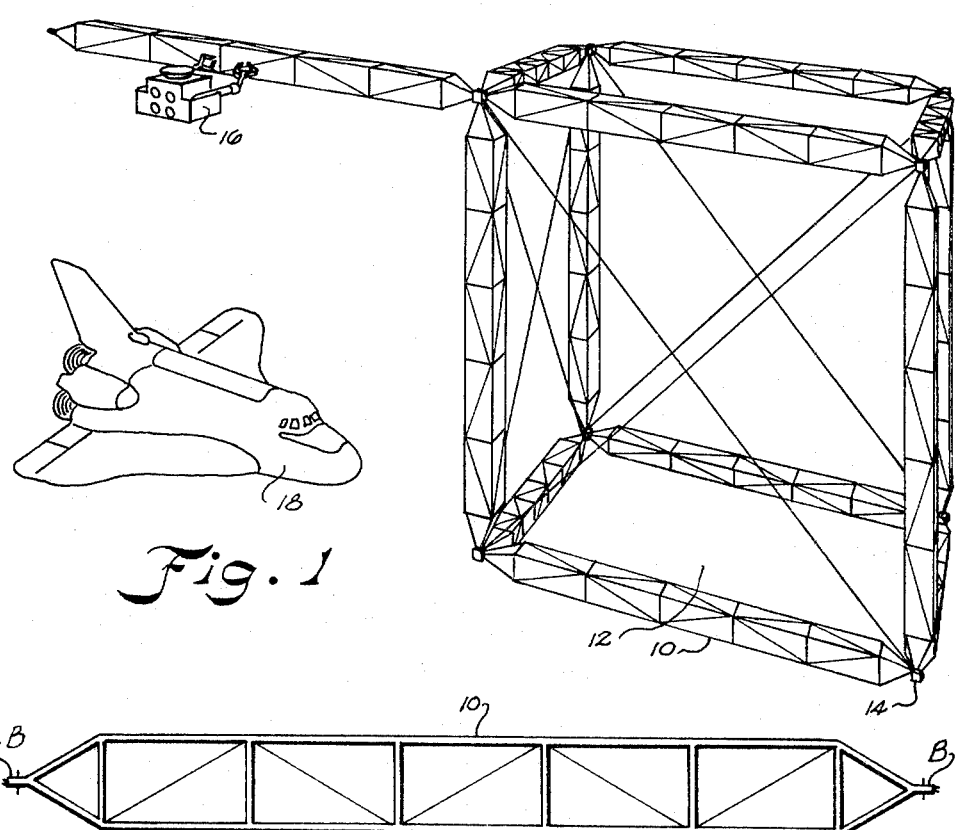
FIG. 1 is a perspective view illustrating a structural assembly utilizing connector apparatus according to the present invention for constructing an orbiting platform in space.
Figure 2:
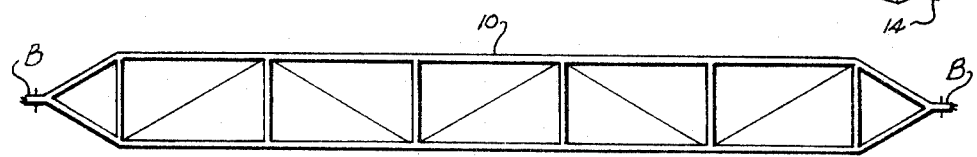
FIG. 2 is a front elevation of a structural beam member incorporating connector apparatus according to the invention.
Figure 3:
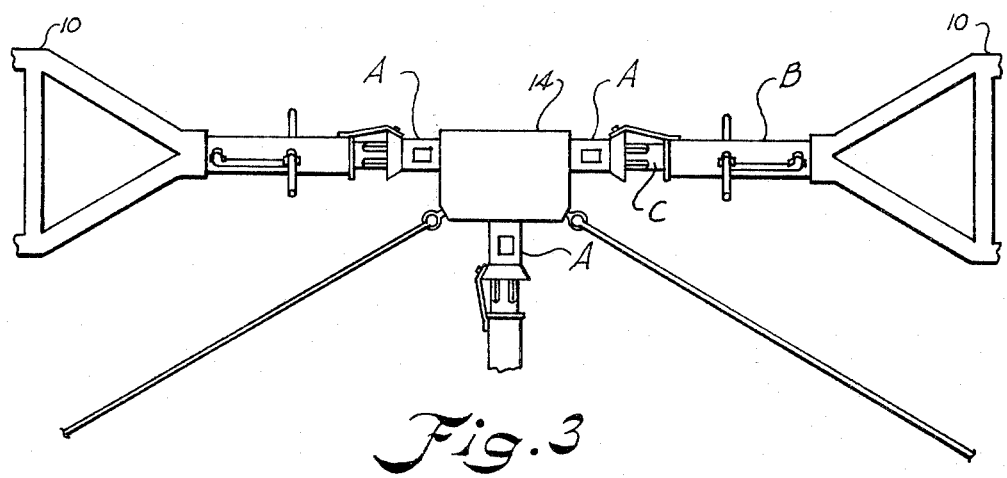
FIG. 3 is an enlarged elevation illustrating connection apparatus and joint constructed according to the invention.

The invention relates to the assembly of a connection joint between two structural members such as beams, particularly to the making and assembly of connection joints in structural systems in space. Planned large structures in space comprise individual lightweight beams of often considerable length and size. In the case of a satellite power system, the number to be linked is quite large and assembly time can be critical.

Apparatus is disclosed for connecting free ends of structural components such as beams and the like which includes a first member A carried by a first of the free ends which has a receptacle, and a second member B carried by a second of the free ends having a housing. A plurality of spaced window openings are formed in the receptacle of the first member and a connector member C is slidably carried by the housing of the second member having prong means adapted for engagement within the window openings. The connector member has an extended position in which the prong means is engaged in the window openings. Lock means is provided for holding the connector member in a retracted position. An actuator means is provided for effecting movement of the connector member between the retracted position and extended position for making the joint connection.

As illustrated, a plurality of structural members 10 are joined together so as to provide a frame 12 which may be part of a space platform assembly in space. Each framework 12 includes a plurality of structural members 10 which are joined together by means of connector apparatus in accordance with the present invention. The individual structural members may be joined, for example, by means of a hub 14 which carries a plurality of connector receptacles A for making connection with respective connector housings B carried by structural members 10. Each beam 10 is typically welded construction which is preassembled before arriving in space. The beams are positioned for interconnection, for example, by the manipulator arms of a teleoperator vehicle 16 which may be remotely controlled from an orbiting shuttle 18 as well as from an earth station. In this case, the actuation of connector member C may be automated in a conventional manner.

Referring in more detail to the drawings, connection apparatus according to the invention is illustrated as including first member A which includes a receptacle 20 having a plurality of window openings 22 formed therein. The receptacle 20 includes a conical tapering inlet 20a whose function will be described later. The housing A is preferably in the form of a cylinder 20 whereby the receptacle 20 has a circular cross-section.

The second member B includes cylindrical housing 24 which slidably receives the connector member C therein. The connector member C includes a cylindrical body 26 having prong means provided by a plurality of prongs 28 circumferentially spaced so as to correspond and align with window openings 22 for engagement therein. A pair of spaced circumferential flanges 29 and 29a slidably position the connector member C within the interior of cylindrical housing 24. Each prong 28 includes a ramp portion 28a and a rear perpendicular engagement portion 28b. The sloping contour of the ramp 28a terminates in a short flat portion 28c.

The connector member C is spring-loaded in housing member A by means of a compression spring 30 which accelerates longitudinal movement of the connector member C to an extended position where it is received in the receptacle 20 with prongs 28 engaged in respective openings 22. In a preferred embodiment, four prongs 28 and openings 22 are utilized.

The cross-sectional diameter of prongs 28 beginning with ramp 28a is larger than that of the internal diameter of receptacle 20 so that during insertion, prongs 28 deflect inwardly and then snap outwardly into openings 22.

Figure 4:
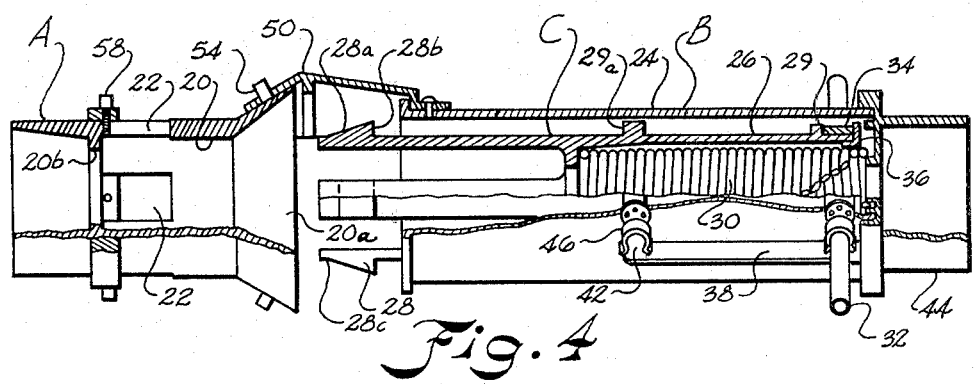
FIG. 4 is a cutaway partially sectional elevational view of connector apparatus constructed according to the invention.
Figure 5:
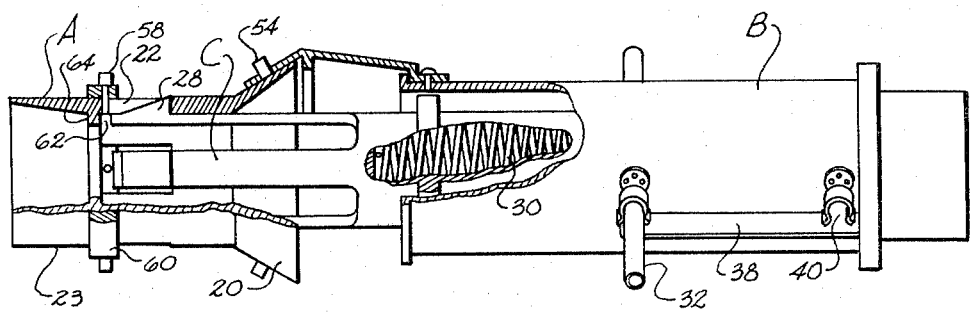
FIG. 5 is a partially cut-away elevation of connector apparatus according to the invention with connection being made therebetween.
Figure 6:
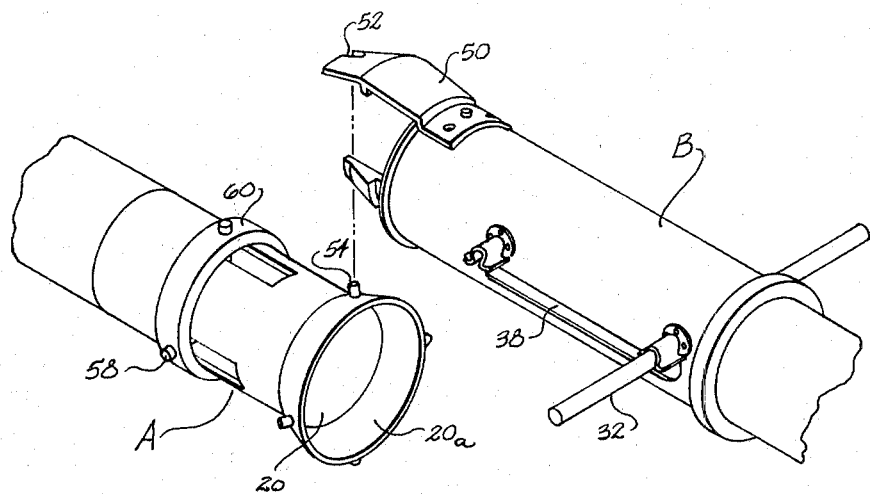
FIG. 6 is a perspective view illustrating connector apparatus according to the invention.

Actuator means for effective movement of the connector member between a retracted position (FIG. 4) and extended position (FIG. 5) is provided by means of handle means which includes arms 32 carried by the connector means C. The handle arms 32 are carried by being fixed to a ring 34 which is slidably received around the cylinder 26 and positioned thereon between flange 29 and a rear cap 36 which is threaded to the interior diameter of the cylinder portion 26. The ring may slide or rotate on the cylinder 26 for purposes as will be hereinafter described. A longitudinal groove 38 is formed in the side of housing 24 through which the handle arms 32 extend. Grooves 38 are formed diametrically opposed on each side of the housing 24 and the handle arms 32 are carried on the ring 34 and approximately 180° from each other so as to extend through the grooves on respective sides of the housing. Lock means are provided by notches 40 formed in housing 24 transverse to and opening into the slot 38 such that when the handle arms 32 are received in the notches 40, longitudinal movement of the connector member C is prevented.

By releasing handle arms 32 from notch 40, the connector member C is allowed to accelerate to the left into the interior of receptacle 20 by means of the force of compression spring 30. In this extended position within the receptacle, the handle arms 32 may be inserted in transverse notches 42 and thus locked in the extended connected position.

The assembly of the housing member B is completed by a cap 44 which is threaded onto the back of the housing cylinder 24 and receives the rear coil of compression spring 30. Member 44 also adapts for connection to the particular structural member being connected in a conventional manner as does member 23 of first member A. Latch means for retaining the handle arms 32 within the notch means 40 and 42 is provided by means of clips 46 carried on the exterior of the housing cylinders 24 overlying the notch means. The handle arms are clipped within the clip 46 and retained in their respective notches.

To facilitate alignment of the connector members A and B when a beam connected thereby is moved laterally into place, which is often the case, a guide plate 50 is provided which is affixed and carried at one end to connector member B. The distal end of the guide plate 50 includes an open-ended slot 52 which receives a guide pin 54 carried on the exterior periphery of conical inlet 20. With the connector member B brought laterally over pin 54, the connector members will be in alignment whereby release of the connector member C results in penetration of the prongs within the receptacle and window openings.

The forward portion 28c of each prong 28 engages a screw 58 carried by a release ring 60. Movement of ring 60 to the right causes screws 58 to slide up slope 28a deflecting prongs 28 inwardly to clear opening 22 whereby withdrawal of the four prongs from the receptacle 20 may be had.

The connection joint provided by connection between connection member A and B accommodates compression, tension, and torque loads. Compression loads are taken up by space 62 between the ends of prongs 28 and a recess ring 64 inside the receptacle. Tension is accommodated by perpendicular faces 28b in engagement with openings 22. Torque is taken up by the sides of prong ramp 28a in the window openings. Although openings 22 are slightly wider than prongs 28, the width difference is not enough to allow excessive torque.

While a preferred embodiment of the invention has been described using specific terms, such description is for illustrative purposes only, and it is to be understood that changes and variations may be made without departing from the spirit or scope of the following claims.

What is claimed is:

1. Apparatus for connecting free ends of a plurality of structural components such as beams and the like comprising:
   a first member adapted for being carried by a first of said free ends having a receptacle;
   a second member adapted for being carried by a second of said free ends having a housing;
   a plurality of spaced window openings formed in said receptacle of said first member;
   a connector member slidably carried by said housing of said second member having a plurality of prong means adapted for engagement within said window openings for resisting relative rotational movements between said first and second members;

said connector member having an extended position relative to said housing in which said prong means is engaged in said window openings;

lock means for holding said connector member in a retracted position retracted longitudinally with respect to said extended position; and actuator means for effecting movement of said connector member between said retracted and extended positions and connecting said members.

2. The apparatus of claim 1 including guide means adapted for interconnecting said first and second members in an aligned position for connection with said connector member.

3. The apparatus of claim 2 wherein said guide means includes a bridge plate having one end carried by one of said first and second members, means for connecting a distal end of said bridge plate to the other of said first and second members to interconnect said members in said aligned position.

4. The apparatus of claim 1 wherein said receptacle of said first member includes a tapered inlet facilitating insertion of said prong means.

5. The apparatus of claim 1 wherein said connector member is slidably received inside said housing of said second member.

6. The apparatus of claim 5 wherein said actuator means includes handle means carried by said connector member, a longitudinal groove formed in said housing through which said handle means extends, said lock means including transverse notch means formed in said housing and said groove for receiving said handle means, said handle means being rotatable into said notch means and out of said groove to lock said connector member against longitudinal movement.

7. The apparatus of claim 6 including latch means for retaining said handle means in said notch means.

8. The apparatus of claim 6 wherein said actuator means includes a spring biased to exert a force on said connector member for movement to said extended position.

9. The apparatus of claim 1 wherein said actuator means includes biasing means accelerating movement of said connector member into said receptacle.

10. The apparatus of claim 1 including handle means included in said actuator means, and notch means included in said lock means for locking said handle means and connector member in said extended position.

11. The apparatus of claim 1 wherein said receptacle and prong means include a generally circular cross-section, said prong means having a cross-sectional diameter larger than that of said receptacle.

12. The apparatus of claim 1 including release means carried by said first member for moving said prong means out of engagement with said window openings.

13. Apparatus for connecting free ends of a plurality of structural components such as beams and the like comprising:

a first member adapted for being carried by a first of said free ends having a receptacle;

a second member adapted for being carried by a second of said free ends having a housing;

a plurality of spaced window openings formed in said receptacle of said first member;

a connector member slidably carried by said housing of said second member having a plurality of prong means adapted for engagement within said window openings for connecting and preventing relative rotation between said first and second members;

said connector member having an extended position wherein said connector member is extended axially relative to said housing, said prong means being engaged in said window openings in said extended position;

lock means for holding said connector member in a longitudinally retracted position;

actuator means for effecting movement of said connector member between said retracted and extended positions;

guide means adapted for interconnecting said first and second members in an aligned position for connection with said connector member in said retracted position; and said receptacle of said first member including a tapered inlet facilitating insertion of said prong means.

14. The apparatus of claim 13 wherein said receptacle and prong means include a generally circular cross-section, said prong means having a cross-sectional diameter larger than that of said receptacle.

15. The apparatus of claim 13 including release means carried by said first member for moving said prong means out of engagement with said window openings.

* * * * *